United States Patent [19]

Kojima et al.

[11] Patent Number: 4,802,563
[45] Date of Patent: Feb. 7, 1989

[54] BRAKING FORCE HOLDING DEVICE FOR AN AIR BRAKE SYSTEM

[75] Inventors: Katsumi Kojima; Ryota Miki, both of Yokosuka, Japan

[73] Assignee: Nippon Air Brake Co., Ltd., Kobe, Japan

[21] Appl. No.: 924,344

[22] Filed: Oct. 24, 1986

[51] Int. Cl.$^4$ ............................................. B60K 41/24
[52] U.S. Cl. .................................. 192/13 A; 137/598
[58] Field of Search ................. 192/4 A, 0.048, 0.049, 192/0.094, 3 H, 3 TR, 13 A; 188/353; 303/89, 24 A, 24 R; 137/598

[56] References Cited
FOREIGN PATENT DOCUMENTS 0105867 6/1983 Japan ................................. 192/13 A Primary Examiner—Rodney H. Bonck
Assistant Examiner—Richard M. Lorence
Attorney, Agent, or Firm—Wenderoth, Lind & Ponack

[57] ABSTRACT

A braking force holding device for an air brake system, maintains a braking force when a vehicle is stopped facing upwardly on a hill to facilitate the start of the vehicle on the hill. The braking force holding device includes a main body having an inlet port connected to a brake valve, an outlet port connected to a pneumatic relay valve, a control port connected to the pneumatic actuator of a clutch operating device, and a passage interconnecting the inlet port and the outlet port; a valve device capable of intercepting the flow of air from the outlet port toward the inlet port; and a control unit for controlling the valve device. The control unit has a movable member capable of being shifted to a first position to open the valve device or to a second position to close the valve device depending on the difference between a force corresponding to the pressure of compressed air applied thereto through the control port and a force corresponding to the pressure of compressed air applied thereto through the outlet port. The timing of relieving the braking pressure maintained is varied according to the level of the braking pressure.

5 Claims, 2 Drawing Sheets

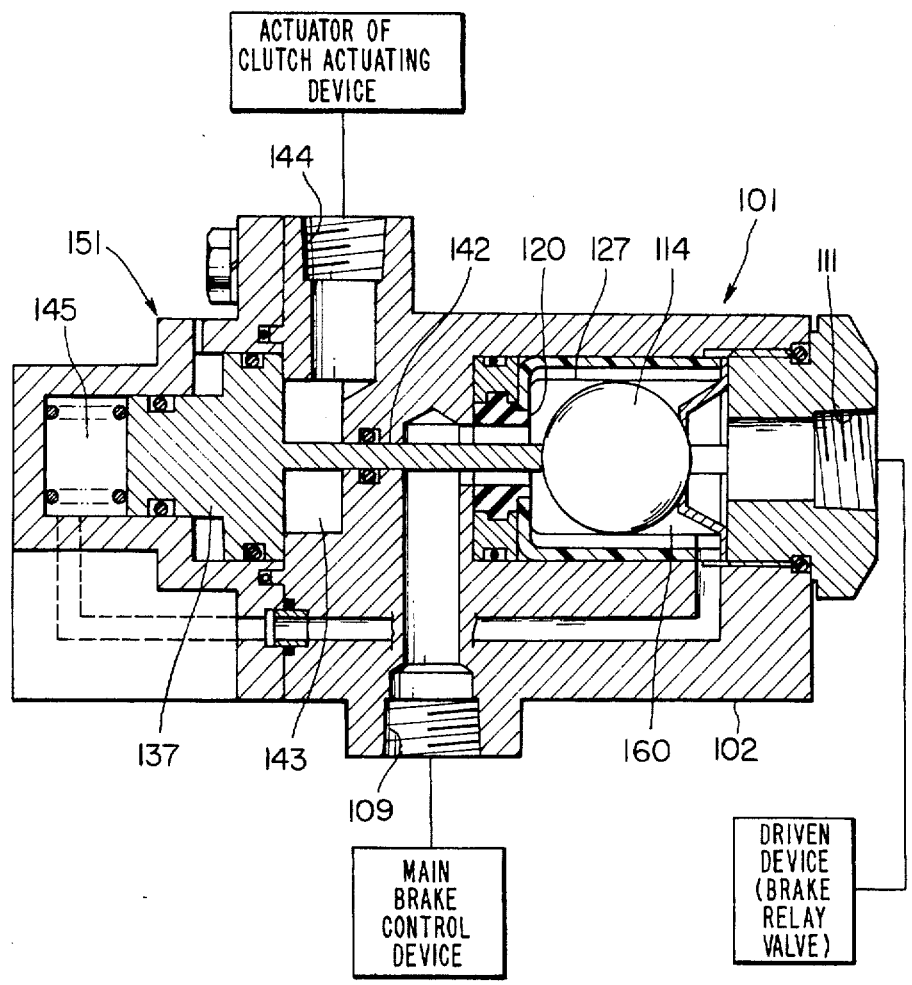

BRAKING FORCE HOLDING DEVICE FOR AN AIR BRAKE SYSTEM

BACKGROUND OF THE INVENTION

1. Field of the Invention:

The present invention relates to a braking force holding device for a vehicle equipped with an air brake system, intended for facilitating the start of the vehicle on an upward hill.

2. Description of the Prior Art:

Japanese Laid-Open Patent Publication No. 58-105867, for instance, discloses a braking force holding device comprising a main body having an inlet port connected to a brake valve which discharges compressed air when operated by the driver, an outlet port connected to a brake actuator which is actuated by compressed air, and a passage interconnecting the inlet port and the outlet port, a first valve provided in the passage, capable of detecting the hill-climbing condition of the vehicle, and capable of closing upon the detection of the hill-climbing condition to intercept the flow of air from the outlet port to the inlet port, and a second valve provided in the passage in parallel to the first valve, having a valve element capable of being moved in the opening direction by a pressure applied thereto on the side of the inlet port and the resilience of a valve spring, and capable of being moved in the closing direction by a liquid pressure applied thereto by a clutch actuator to intercept the flow of air from the outlet port to the inlet port.

In operation, the first valve closes when the vehicle comes to a hill. Then, when the clutch actuator is operated to disengage the clutch after supplying compressed air to the brake actuator by operating the brake valve to stop the vehicle, liquid pressure produced by the clutch actuator shifts the valve element of the second valve against the pressure applied to the valve element on the side of the inlet port and the resilience of the valve spring to close the second valve. Thus, both the first and second valves are closed to disconnect the inlet port and the outlet port. Consequently, the pressure applied to the brake actuator is maintained even if the operation of the brake valve is cancelled after the vehicle has been braked to a stop as long as the clutch is held disengaged, so that the braking force is maintained to hold the vehicle stopped. During the starting of the vehicle, when the clutch engaging operation is performed in combination with the operation of the accelerator, the effect of the liquid pressure applied to the valve element by the clutch actuator decreases below the resilience of the valve spring to allow the valve element to be shifted in the opening direction and hence, the second valve is opened. Thus, the braking pressure maintained in the brake actuator is relieved as the driving force of the engine is transmitted through the clutch to the driving wheels. Accordingly, the vehicle can be easily started on a hill without requiring simultaneous dexterous manipulation of the hand brake, the accelerator and the clutch.

In this known braking force holding device, the second valve is opened to start relieving the brake holding pressure after the liquid pressure applied to the second valve by the clutch actuator has dropped to a fixed level below the resilience of the valve spring and the frictional engagement of the clutch has been enhanced to a fixed degree. Thus, the opening timing of the second valve is dependent on the resilience of the valve spring regardless of the level of the brake holding pressure. On the other hand, in an air brake system employing compressed air as a working fluid, the pressure reduction rate, namely, pressure reduction per unit time, is comparatively high at the moment of actuation of the brake pressure relief valve. However, the pressure reduction rate decreases with time. Therefore, the air brake system requires a comparatively long time, as compared with a hydraulic brake system, for sufficiently relieving the brake pressure. Such a characteristic of the air brake system is enhanced when the brake pressure is high.

Accordingly, when the grade of the hill or the weight of the vehicle is large and the brake pressure is maintained at a high level while the vehicle is stopped, the relief of the brake pressure is delayed relative to the degree of frictional engagement of the clutch according to the progress of clutch engaging operation. Therefore, the brake pressure is not reduced according to the increase of the driving force transmitted to the driving wheels through the clutch, and hence, an excessive braking force works on the vehicle against the driving force. Consequently, the drag of the brakes, the excessive slip of the clutch and engine stop are likely to occur.

Thus, the conventional braking force holding device causes the rapid abrasion of the clutch facing and the brake linings or impedes the smooth start of the vehicle, when the braking pressure is maintained at a high level.

SUMMARY OF THE INVENTION

Accordingly, it is an object of the present invention to provide a braking force holding device for an air brake system, capable of varying brake releasing timing according to the level of the braking pressure maintained so that the rapid wear of the frictional members of the brakes and the clutch due to delay in releasing the brakes and the vehicle can be easily and smoothly started when on a hill and facing upwardly.

In order to achieve the object of the invention, the present invention provides a braking force holding device for an air brake system, comprising: a main body having an inlet port connected to a main brake control device, such as a brake valve, which discharges compressed air when operated by the driver, an outlet port connected to a driven device, such as a brake relay valve, which is actuated by compressed air, a control port connected to the actuator of a clutch operating device which is actuated by compressed air, and a passage interconnecting the inlet port and the outlet port; a valve device disposed in the passage, and capable of intercepting the flow of air from the outlet port toward the inlet port; and a control unit having a movable member capable of being shifted toward a first position for opening the valve device by a pressure applied to the outlet port, and being shifted toward a second position for closing the valve device by a pressure applied to the control port.

The movable member of the control unit is moved between the first position and the second position according to the difference between the pressure applied to the clutch operating device and the pressure maintained in the driven device, to control the valve device. During the release of the brakes in response to clutch engaging operation, when a force corresponding to the pressure produced by the clutch operating device, which decreases with the progressive engagement of the clutch, becomes smaller than a force corresponding to the braking pressure maintained in the driven device, the movable member is shifted from the second position to the first position to open the valve device. Since the higher the braking pressure maintained in the drive device, the lower the reduction rate of the pressure of the clutch operating device, the movable member starts moving toward the first position to open the valve device while the degree of frictional engagement of the clutch is small, so that braking pressure relieving timing is advanced. Thus, even when a high braking force is held, the braking pressure is reduced to a level capable of providing a braking force necessary for restraining the vehicle from backward movement, when the frictional engagement of the clutch is enhanced to a degree where the clutch is in slipping engagement. Consequently, the braking pressure is reduced at an appropriate rate according to the increase of the driving force transmitted through the clutch to the driving wheels.

As is apparent from the foregoing description, the present invention prevents the rapid wear of the frictional members of the brakes and the clutch due to the delayed release of the brakes, and enables the vehicle to be started easily and smoothly on a hill when facing upward without the drag of the brakes and the possibility of engine stop.

Furthermore, according to the present invention, the actuator of the clutch operating device is operated by compressed air and does not have any part operated by liquid pressure, which is higher than the pressure of the compressed air. Therefore, conditions of pressure tightness and strength of the braking force holding, device according to the present invention are reduced as compared with the conventional braking force holding device employing liquid pressure working in the clutch operating device for controlling the valve unit. Accordingly, the present invention improves the productivity of the production line for producing the braking force holding device, and enhances the reliability of the braking force holding device.

The above and other objects, features and advantages of the present invention will become more apparent from the following description taken in conjunction with the accompanying drawings.

BRIEF DESCRIPTION OF THE DRAWINGS

FIG. 2 is a sectional view of a braking force holding device, in a second embodiment, according to the present invention.

DESCRIPTION OF THE PREFERRED EMBODIMENT

Figure 1:
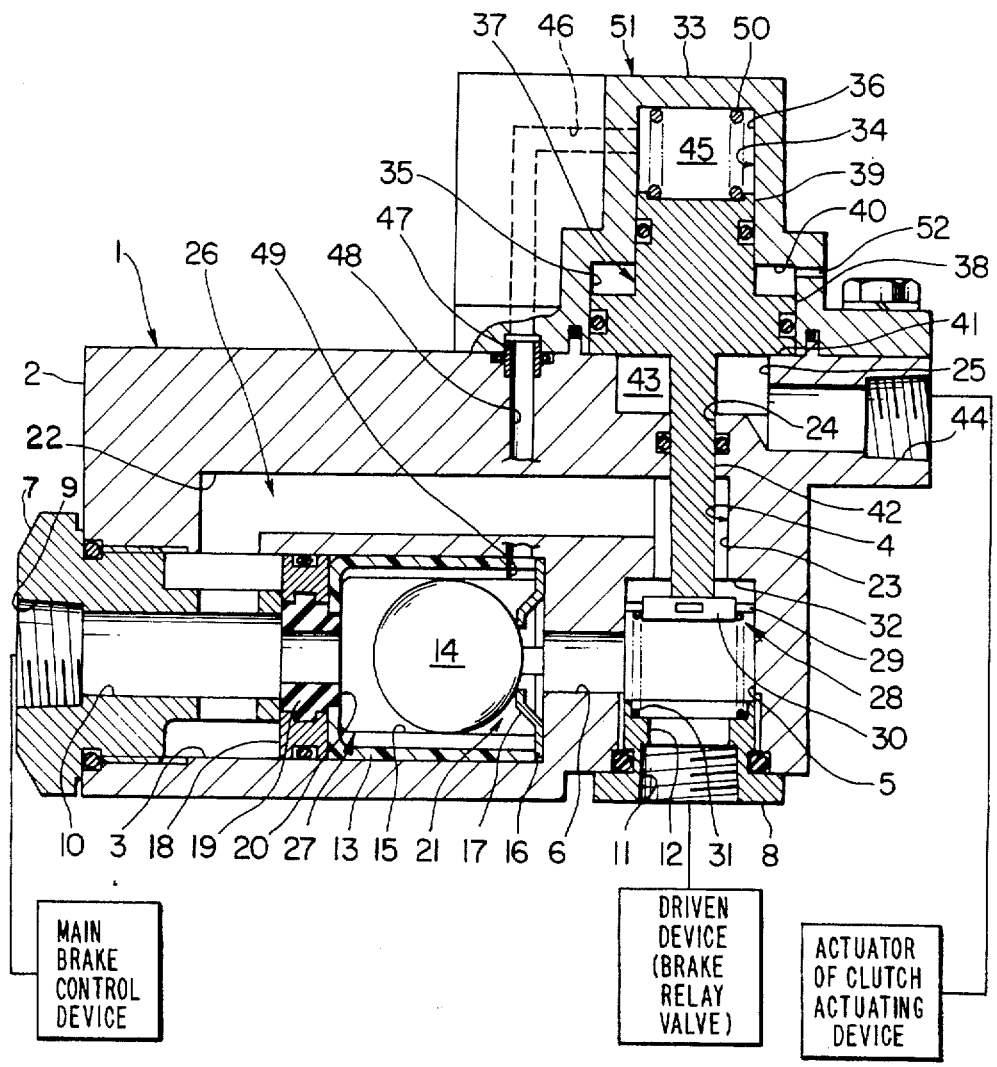
FIG. 1 is a sectional view of a braking force holding device, in a first embodiment, according to the present invention.

Referring to FIG. 1, indicated generally at 1 is a braking force holding device, in a first embodiment, according to the present invention, and at 2 is a main body. A large diameter bore 3 is formed horizontally in the lower part of the main body 2 so as to be open to the left side surface, as viewed in FIG. 1, of the main body 2. An inlet fitting 7 having an inlet port 9 and an inlet passage 10 connecting the inlet port 9 to the large diameter bore 3 is screwed in the large diameter bore 3. A sealing ring is provided between the head of the inlet fitting 7 and the main body 3 to seal the large diameter bore 3 airtightly. A stepped vertical bore 4 having a lower large diameter section 5 opening to the lower surface of the main body 2 is formed vertically, as viewed in FIG. 1, through the main body 2. The large diameter bore 3 communicates with the large diameter section 5 of the vertical bore 4 by means of a through hole 6. An outlet fitting 8 is screwed in the lower opening of the large diameter section 5, and a sealing ring is provided between the head of the outlet fitting 8 and the main body 2 to seal the large diameter section 5 airtightly. The outlet fitting 8 has an outlet port 11 and an outlet passage 12 interconnecting the outlet port 11 and the vertical bore 4.

A substantially cylindrical guide member 13 made of a synthetic resin and having a radially inwardly extending brim is fitted in the inner portion of the large diameter bore 3 with the brim thereof disposed on the side of the inlet port 9. A plurality of axial ridges 15 are formed in the inner circumference of the guide member 13. A ball 14 is contained within the guide member 13 so as to be guided by the axial ridges 15 for free movement within the guide member 13. A retainer 16 having a plurality of tongues 17 is disposed between the guide member 13 and the inner end of the large diameter bore 3. When the ball 14 is moved under its own weight rightward, as viewed in FIG. 1, the ball 14 abuts against the tongues 17. The outer end of the guide member 13 communicates with the through hole 6 by means of furrows formed between the axial ridges 15 and the inside opening of the retainer 16.

An annular supporting member 18 provided with a sealing ring in the outer circumference thereof is fitted in the large diameter bore 3 between the inlet fitting 7 and the guide member 13. An annular seat member 19 made of an elastic material is fitted in the inside opening of the supporting member 18 with the annular flange thereof engaging an annular groove formed in the inner circumference of the supporting member 18. A valve seat 20 for receiving the ball 14 is provided in a portion of the seat member 19 fitted in the inside opening of the brim of the guide member 13. The retainer 16, the guide member 13 and the supporting member 18 holding the seat member 19 are positioned with respect to the axial direction between the inner end of the large diameter bore 3 and the inner end of the inlet fitting 7.

A passage 22 is formed above the large diameter bore 3 to connect a cavity defined by the outer circumference of the inlet fitting 7 and the inner circumference of the large diameter bore 3 to a medium diameter section 23 of the vertical bore 4. The inlet passage 10 communicates with the outlet passage 12 by means of a first or bypass air passage 21 including the inside hole of the seat member 19, the interior of the guide member 13, the through hole 6 and the large diameter section 5 of the vertical bore 4, and also by means of a second passage 26 including the cavity, the passage 22, the medium diameter section 23 of the vertical bore 4 and the large diameter section 5 of the same. The ball 14 and the valve seat 20 constitute a holding valve 27 for intercepting the flow of air through the first passage 21 from the outlet port 11 toward the inlet port 9. A check valve 28 is provided within the large diameter section 5 to intercept the flow of air through the second passage 26 from the outlet port 11 toward the inlet port 9. The holding valve 27 and the check valve 28 constitute a valve device for intercepting the flow of air from the outlet port 11 toward the inlet port 9. The check valve 28 comprises a disk-shaped valve element 30 having projections projecting radially outwardly from the circumference thereof, a valve seat 32 provided on the upper end of the large diameter section 5, and a comparatively weak valve spring 31 biasing the valve element 30 toward the valve seat 32.

A cover 33 is airtightly attached to the upper surface of the main body 2 so as to cover an upper large diameter section 25 of the vertical bore 4, and a stepped cylindrical hole 34 is formed coaxially with the vertical bore 4 in the cover 33. The cylindrical hole 34 has a large diameter section 35 and a small diameter section 36. The large diameter section 35 of the cylindrical hole 34 is contiguous to the upper large diameter section 25 of the vertical bore 4. The inside diameter of the upper large diameter section 25 of the vertical bore 4 is smaller than the inside diameter of the large diameter section 35 and is greater than the inside diameter of the small diameter section 36.

A movable member 37 having a large section 38 and a small section 39 provided with sealing rings in the respective circumferences thereof is fitted in the cylindrical hole 34 so that the large section 38 and the small section 39 are axially movable in the large diameter section 35 and the small diameter section 36 of the cylindrical hole 34, respectively. The axial movement of the large section 38 is limited by a shoulder 40 defined between the large diameter section 35 and the small diameter section 36, and a shoulder 41 defined between the large diameter section 35 and the vertical bore 4. A stem 42 is formed integrally with the movable member 37. The stem 42 extends slidably through a small diameter section 24 provided with a sealing ring via the medium diameter section 23 into the lower large diameter section 5 of the vertical bore 4. The lower end of the stem 42 is able to engage the valve element 30 of the check valve 28. The length of the stem 42 is determined so that the stem 42 pushes the valve element 30 away from the valve seat 32 to open the check valve 28 when the movable member 37 is at a first position wherethe lower end of the large section 38 is in contact with the shoulder 41 and so that the stem 42 allows the valve spring 31 to seat the valve element 30 on the valve seat 32 so that the check valve 28 is able to function normally according to a differential pressure.

A control pressure chamber 43 is defined by the lower end of the large section 38 of the movable member 37 and the upper large diameter section 25 of the vertical bore 4. The control pressure chamber 43 communicates with a control port 44 formed in the right side surface, as viewed in FIG. 1, of the main body 2. An outlet pressure chamber 45 is defined by the upper end of the small section 39 of the movable member 37 and the small diameter section 36. The outlet pressure chamber 45 communicates with a part of the holding valve 27 on the side of the outlet port 11 by means of a passage 46 (indicated by broken lines in FIG. 1) formed in the cover 33, a pipe 47 attached to the main body 2, a bore 48 formed in the main body 2, and a recess formed in the right end of the guide member 13 opposite to the bore 48. A spring 50 is provided in the small diameter section 36 to apply a predetermined pressure to the small section 39 of the movable member 37 so as to bias the movable member 37 downward, namely, toward the first position, against the frictional resistance of the sealing rings provided on the large section 38 and the small section 39 of the movable member 37, and the sealing ring provided in the annular groove of the small diameter section 24 of the vertical bore 4. A chamber defined by the shoulder 40 and the large section 38 of the movable member 37 always communicates with the atmosphere by means of a small hole 52 formed in the side wall of the cover 33.

The cover 33 having the cylindrical hole 34, the movable member 37 having the stem 42, the control pressure chamber 43, the outlet pressure chamber 45 and the spring 50 constitute a control unit 51 for controlling the check valve 28. The braking force holding device 1 having the control unit 51 is mounted on the chassis of the vehicle with the side having the control port 44, namely, the right-hand side of the main body 2 as viewed in FIG. 1, on the front side of the vehicle.

The inlet port 9 is connected to a main brake control device, not shown, such as a brake valve which is connected to a compressed air reservoir and discharges compressed air when operated by the driver or a relay valve which receives a pilot pressure from a brake valve and discharges compressed air under a pressure corresponding to the pilot pressure. The outlet port 11 is connected to a driven device, not shown, such as a brake actuator, a brake chamber or an air over hydraulic booster which is driven by compressed air to actuate the brakes of the vehicle, or a relay valve which receives a pilot pressure from the main brake control device and supplies a pressure corresponding to the pilot pressure to the brake actuator. The control port 44 is connected to the actuator of a clutch actuating device, not shown, such as a clutch booster, which is driven by compressed air to operate the clutch disposed between the engine and the transmission of the vehicle. The lower end of the large section 38 of the movable member 37 of the control unit 51 receives a pressure produced by the clutch booster, while the upper end of the small section 39 of the movable member 37 of the same receives a pressure applied to the driven device through the outlet port 11.

The operation of the braking force holding device will be described hereinafter.

The braking force holding device 1 is in a state shown in FIG. 1 while the vehicle is running on a flat road and neither the brake nor the clutch is operated. The ball is separated from the valve seat 20 and is in abutment with the retainer 16 to open the holding valve 27. Only the resilience of the spring 50 is acting on the movable member 37 of the control unit 51 to hold the movable member 37 at the first position where the large section 38 is seated on the shoulder 41 and the stem 42 positions the valve element 30 of the check valve 28 away from the valve seat 32 to open the check valve 28, and the inlet port 9 communicates with the outlet port 11 by means of the first passage 21 and the second passage 26.

When the vehicle comes to a hill and begins to climb the hill, the braking force holding device 1 is inclined right-hand side up, as viewed in FIG. 1. Consequently, the ball 14 moves toward the valve seat 20 and is seated on the valve seat 20 to close the holding valve 27. When the brakes are applied in this state to stop the vehicle, compressed air discharged from the brake valve is supplied through the inlet port 9, the inlet passage 10, the second passage 26 and the outlet port 11 to the relay valve to actuate the brake actuator. A portion of the compressed air thus supplied moves the ball 14 away from the valve seat 20 and flows through the first passage 21 toward the outlet port 11. However, upon the movement of the ball 14 away from the valve seat 20, the pressure on opposite sides of the ball 14 is equalized, and hence the ball 14 moves toward the valve seat 20 and is seated again on the valve seat 20 to close the holding valve 27 again. Compressed air supplied through passage 26, passage 6, the inlet port 9 flows through the bore 48 and the passage 46 into the outlet pressure chamber 45 of the control unit 51 to apply a pressure to the upper end of the small section 39 of the movable member 37.

When the driver steps on the clutch pedal to disengage the clutch after the vehicle has been braked and has sufficiently been decelerated, compressed air supplied to the clutch booster flows through the control port 44 into the control pressure chamber "43" to apply a pressure to the lower end of the large section 38 of the movable member 37. As the clutch pedal is depressed further, the pressure within the control pressure chamber 43 increases. When the force acting on the lower end of the large section 38 of the movable member 37 exceeds the force pressing the movable member 37 toward the first position, the movable member 37 is moved upward. As the movable member 37 is moved upward, the valve element 30 of the check valve 28, which has been separated from the valve seat 32 by the stem 42 of the movable member 37, is moved toward the valve seat 32 by the valve spring 31 and, finally, the valve element 30 is seated on the valve seat 32 to close the check valve 28. When the movable member 37 is moved to the second position where the upper end of the large section of the movable member 37 is brought into contact with the shoulder 40, the lower end of the stem 42 is separated from the valve element 30 of the check valve 28 to allow the check valve 28 to operate normally for intercepting, only the flow of air from the outlet port 11 through the passage 26 toward the inlet port 9.

After the clutch has been entirely disengaged and the vehicle has been stopped, the holding valve 27 and the check valve 28 are closed, so that the flow of air from the outlet port 11 through the first passage 21 and the second passage 26 toward the inlet port 9 is intercepted. Consequently, the pressure supplied to the relay valve by the compressed air supplied thereto through the outlet port 11 is maintained to hold the braking force as long as the clutch is held disengaged, even when the compressed air supplied to the inlet port 9 is discharged by the brake valve by releasing the brake pedal. Thus, the vehicle is kept in a braked state.

Since the outlet pressure chamber 45 of the control unit 51 always communicates with the outlet port 11 by means of the outlet passage 12, the through hole 6, the recess 49, the bore 48 and the passage 46 regardless of the condition of the holding valve 27 and the check valve 28, the pressure of the compressed air held in the relay valve works continuously on the upper end of the small section 39 of the movable member 37 while the vehicle is stopped. However, since the pressure applied to the lower end of the large section 38 of the movable member 37 by the clutch booster when the clutch was disengaged remains effective and the force acting on the lower end of the large section 38 of the movable member 37 is greater than the force acting on the upper end of the small section 39 of the movable member 37, the movable member 37 is restrained at the second position. When the transmission is shifted to a desired gear, and the clutch is engaged gradually as the accelerator is operated to increase the engine speed to start the vehicle, the pressure prevailing in the control pressure chamber 43 is reduced gradually as the clutch is engaged progressively. Consequently, the force restraining the movable member at the second position against the resilience of the spring 50 and the force produced by the pressure prevailing within the outlet pressure chamber 45 corresponding to the pressure holding the braking force decreases gradually and, finally, the force retaining the movable member 37 at the second position decreases below the force pressing the movable member 37 toward the first position. Then, the movable member 37 is moved down toward the first position, and then the lower end of the stem 42 is brought into contact with the valve element 30 of the check valve 28 to separate the valve element 30 from the valve seat 32, so that the check valve 28 is opened. Consequently, the compressed air held in the relay valve is allowed to flow through a gap between the valve element 30 and the valve seat 32, the second passage 26 and the inlet port 9, and is discharged gradually from the brake valve, and thus the pressure held in the brake actuator is reduced accordingly. When the check valve 28 is opened, the compressed air held within the outlet pressure chamber 45 of the control unit 51 is discharged through the passage 46, the bore 48, the recess 49, the through hole 6, and the inlet port 9, and thus, the pressure prevailing within the outlet pressure chamber 45 is reduced gradually. However, the movable member 37 is moved down by the resilience of the spring 50 to the first position until the lower end of the large section 38 abuts against the shoulder 41, whereby the check valve 28 is held open by the stem 42. Thus, as the clutch is engaged progressively to transmit the driving force increasingly to the driving wheels, the braking force is reduced accordingly.

The pressure to be held on the side of the outlet port 11 to hold the vehicle stationary on an upward hill is proportionally dependent on the grade of the hill and the weight of the vehicle. However, the higher the braking pressure held to hold the vehicle on the hill, the earlier the opening of the check valve as the clutch is engaged progressively to start the vehicle. That is, the higher the pressure held on the side of the outlet port 11 and, hence, the higher the pressure prevailing within the outlet pressure chamber 45 of the control unit 51, the greater is the force acting on the movable member 37 to urge the same toward the first position for opening the check valve 28. Therefore, the difference between the force urging the movable member 37 toward the first position and the force corresponding to the pressure of the compressed air supplied to the control pressure chamber 43 when the clutch was disengaged to restrain the movable member 37 at the second position is small while the braking pressure is held. Accordingly, the force urging the movable member 37 toward the first position exceeds the force urging the movable member 37 toward the second position when the pressure within the control pressure chamber 43 is reduced by a small degree as the clutch is engaged progressively, and hence the movable member 37 starts moving toward the first position at an early timing relative to the degree of engagement of the clutch. Consequently, the check valve 28 is opened by the stem 42 at an advanced timing where the degree of engagement of the clutch is small. Thus, the timing of the opening of the check valve 28 relative to the degree of engagement of the clutch is controlled corresponding to the magnitude of the pressure held on the side of the outlet port 11. Therefore, the braking pressure is reduced to an extent for providing a braking force necessary only for checking the backward movement of the vehicle when the clutch is in slipping engagement, even when a high pressure is held on the side of the outlet port 11. Accordingly, the vehicle starts climbing the hill without entailing adverse influence on the clutch and the brakes.

A braking force holding device, in a second embodiment according to the present invention will be described hereinafter with reference to FIG. 2.

The braking force holding device 101 has a main body 102 having a passage 160 interconnecting an inlet port 109 and an outlet port 111. Only a holding valve 127 having a ball 114 capable of moving toward a valve seat 120 when the vehicle comes to a hill and faces upwardly is provided in the passage 160. A control unit 151 for controlling the holding valve 127 is disposed coaxially with the passage 160. The driving force holding device 101 is mounted on the vehicle with the right-hand side, as viewed in FIG. 2, of the main body 102 provided with the outlet port 111 disposed on the front side of the vehicle. The control unit 151 has a construction similar to the control unit 51 of the first embodiment. Compressed air supplied through a control port 144 into a control pressure chamber by a clutch booster applies a pressure to a movable member 137 having a stem 142 capable of engaging the ball 114 so as to urge the movable member 137 in a direction to close the holding valve 127 while compressed air supplied from the outlet port 111 into an outlet pressure chamber 145 applies a pressure to the movable member 137 so as to urge the movable member 137 in a direction to open the holding valve 127. The movable member 137 moves in either direction depending on the pressure, difference between the control pressure chamber 143 and the outlet pressure chamber 145.

The second embodiment is different from the first embodiment in that the opening of the holding valve 127 is controlled so that the time at which the braking force is relieved is advanced relative to the degree of engagement of the clutch with the increase of the pressure held on the side of the outlet port 111. The operation of the second embodiment is substantially the same as that of the first embodiment. Therefore the description of the operation will be omitted.

Thus, according to the present invention, the pressure of compressed air held in the driven device on the side of the outlet port 11, 111 is applied to the movable member 37, 137 of the control unit 51, 151 so as to urge the movable member 37, 137 toward the first position to open the check valve 28 or the holding valve 127 while the pressure of compressed air supplied to the clutch booster is applied to the movable member 37, 137 of the control unit 51, 151 so as to urge the movable member 37, 137 toward the second position to enable the check valve 28 to operate normally or to close the holding valve 127, and the movable member 37, 137 is shifted between two positions corresponding to the first position and the second position depending on the difference between the opposite forces produced by the respective pressures for controlling the check valve 28 or the holding valve 127. Accordingly, the braking force is maintained as long as the clutch remains disengaged and the braking pressure is relieved as the clutch is engaged progressively. Consequently, the vehicle can easily be started on an upward hill without requiring the operation of the hand brake in combination with the dexterous manipulation of the clutch and the accelerator. Furthermore, since the higher the braking pressure held on the side of the outlet port 11, 111, the earlier the check valve 28 opens or the holding valve 127 opens for relieving the braking pressure relative to the degree of frictional engagement of the clutch. The adverse action of an excessive braking force against the driving force transmitted to the driving wheels, the excessive slip of the clutch, the drag of the brakes and engine stop in starting the vehicle are prevented.

Additionally, since the compressed air supplied to the clutch booster of the clutch actuating device is also supplied through the control port 44, 144 into the control pressure chamber 43, 143, and the control unit 51, 151 utilizes the pressure of the compressed air supplied into the control pressure chamber 43, 143 for controlling the check valve 28 or the holding valve 127, the braking force holding device according to the present invention comprises only pneumatic components. Accordingly, conditions of pressure tightness and strength of the main body 2, 102 and the components of the control unit 51, 151 of the braking force holding device according to the present invention are relaxed as compared with the conventional braking force holding device employing liquid pressure which produces a force greater than that produced by compressed air, produced by the clutch actuating device. Thus, the present invention improves the productivity of the production line for producing the braking force holding device, and enhances the reliability of the braking force holding device.

Although the present invention has been described with reference to the two preferred embodiments thereof by way of example, the invention is not limited thereto and many variations and changes are possible in the invention without departing from the scope thereof.

For example, the movable member 37, 137 having the shape of a piston slidably fitted in the cylindrical bore of the control nit .may be substituted by a diaphragm having an integral operating member capable of engaging the valve element of the check valve 28 or the holding valve 127, and disposed so as to receive the pressure on the side of the control port and the pressure on the side of the outlet port on the opposite sides thereof, respectively. When such a diaphragm is employed as the movable member, it is possible to omit the spring for urging the movable member in a direction to open the check valve or the holding valve. It is also possible to control the valve device, namely, the check valve or the holding valve, by disposing the control unit so that the axis thereof intersects the axis of the valve device and by transmitting the displacement of the, movable member through another movable member having a surface inclined to the valve element of the valve device, instead of disposing the control unit and the valve device so that the movable member of the control unit and the valve element of the valve device are coaxial. Furthermore, it is also possible to control the valve device by disposing the control unit on the side of the outlet port of the valve device, instead of disposing the same on the side of the inlet port of the valve device. Still further, it is possible to employ a valve device comprising, in a parallel arrangement, an electromagnetic valve capable of isolating the inlet port and the outlet port from each other upon the reception of an electric signal provided by means for detecting the grade of the road and the running speed of the vehicle, and a check valve for intercepting the flow of air from the outlet port toward the inlet port, and to control the timing of the opening of the check valve.

Although the invention has been described in its preferred forms with a certain degree of particularity, it is to be understood that many variations and changes are possible in the invention without departing from the scope and spirit thereof.

What is claimed is:

1. A braking force maintaining device for an air brake system of a vehicle including a main brake control device that discharges compressed air when operated by a driver of the vehicle, driven device that is actuated by compressed air to brake the vehicle, and an actuator of a clutch operating device that is actuated by compressed air, said braking force maintaining device comprising:

a main body having an inlet port connected to the main brake control device for receiving the compressed air discharged therefrom, an outlet port connected to the driven device, a control port connected to the actuator of the clutch operating device for receiving compressed air therefrom when the actuator is actuated, and an air passage extending between and communicatable with said inlet port and said outlet port;

a valve device comprising a valve seat defined on the main body between said air passage and said outlet port, and a valve body movably seated on said valve seat over said air passage; and a control unit having a movable member operatively connected to the valve body for moving said valve body between a first position at which the valve body is off of said valve seat and said inlet port communicates with said outlet port through said air passage and a second position at which the valve body is seated on said valve seat to block said inlet port from said outlet port via said air passage, said movable member having a first respective pressure receiving portion upon which when pressure acts the movable member is movable in a direction to move said valve body from said second position to said first position and a second respective pressure receiving portion upon which when pressure acts the movable member is movable in a direction to move said valve body from said first position to said second position, a first chamber constantly open to said outlet port for receiving compressed air from the driven device to which the outlet port is connected, said first chamber facing said first respective receiving portion of the movable member so that the compressed air received therein acts on the first respective pressure receiving portion to move said valve body toward said first position, and a second chamber constantly open to said control port for receiving the compressed air received by the control port from the actuator of the clutch control device, said second chamber facing said second respective pressure receiving portion so that the compressed air received therein acts on the second respective pressure receiving portion.

2. A braking force maintaining device as claimed in claim 1,
wherein said movable member comprises a stem and said valve body comprises a check valve engageable with said stem.

3. A braking force maintaining device as claimed in claim 1,
wherein said movable member is a piston, and the effective area of said first respective pressure receiving portion is greater than the effective area of said second respective pressure receiving portion.

4. A braking force maintaining device as claimed in claim 1,
wherein said main body has a bypass air passage extending between said inlet port and said outlet port and bypassing said valve device, and a check valve disposed in said bypass air passage and biased toward a first position therein under its own weight.

5. A braking force maintaining device as claimed in claim 1,
wherein the first chamber of said control unit is defined at an end of said movable member, and said control unit includes a bore bypassing said valve device and extending between and constantly open to said first chamber and said outlet port for maintaining said first chamber constantly open to said outlet port.

* * * * *